Patented Dec. 5, 1922.

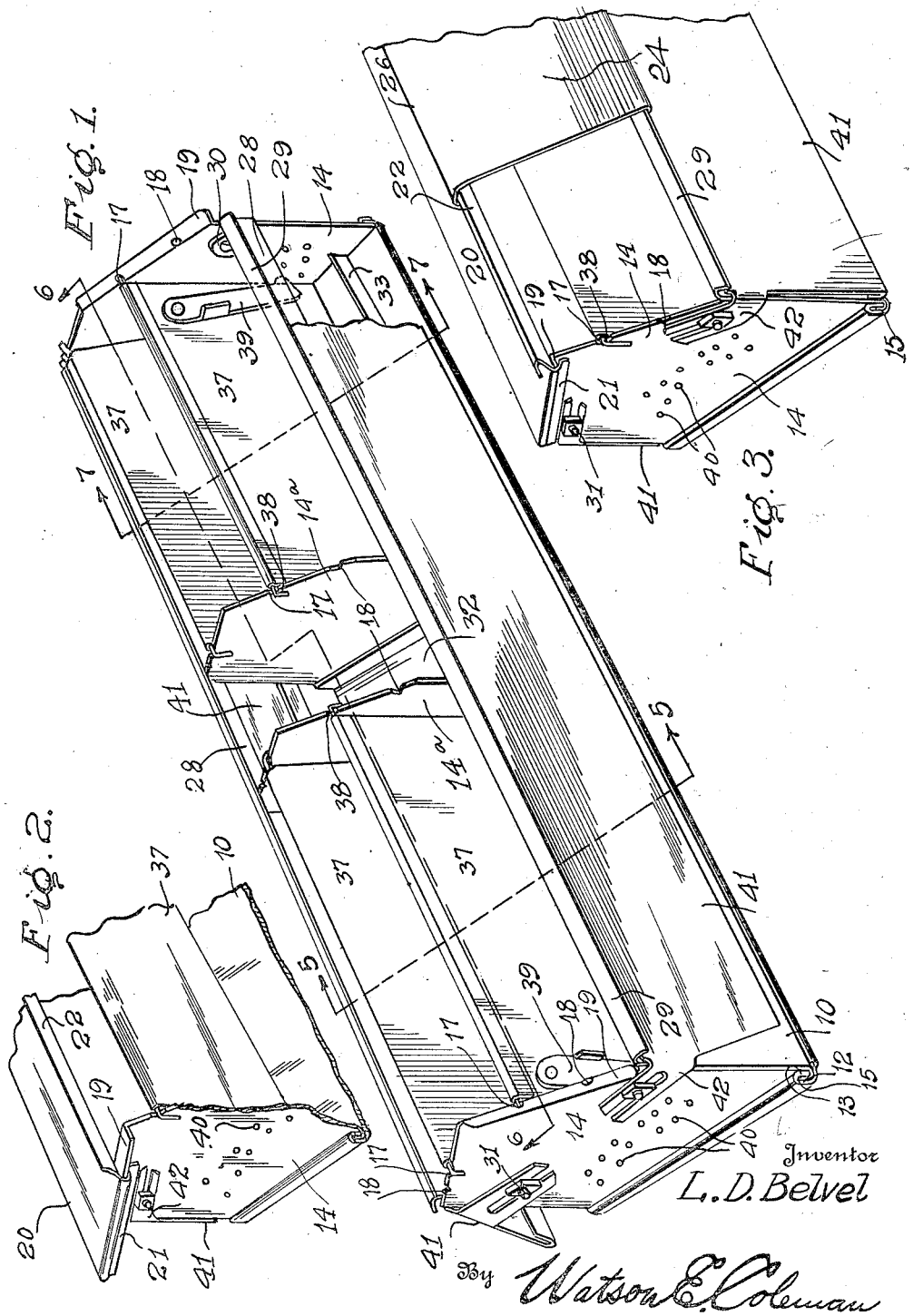

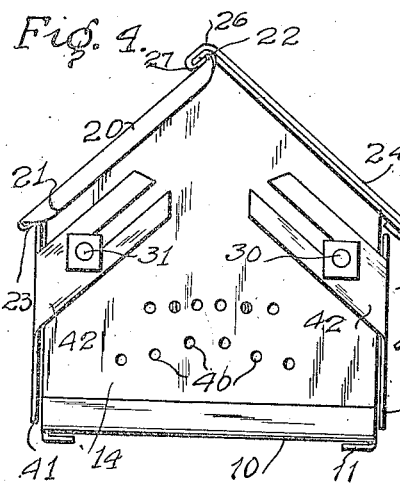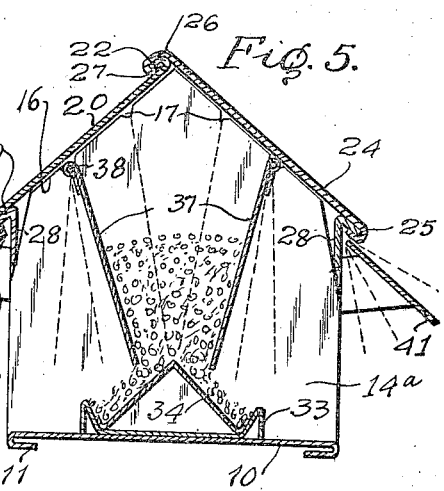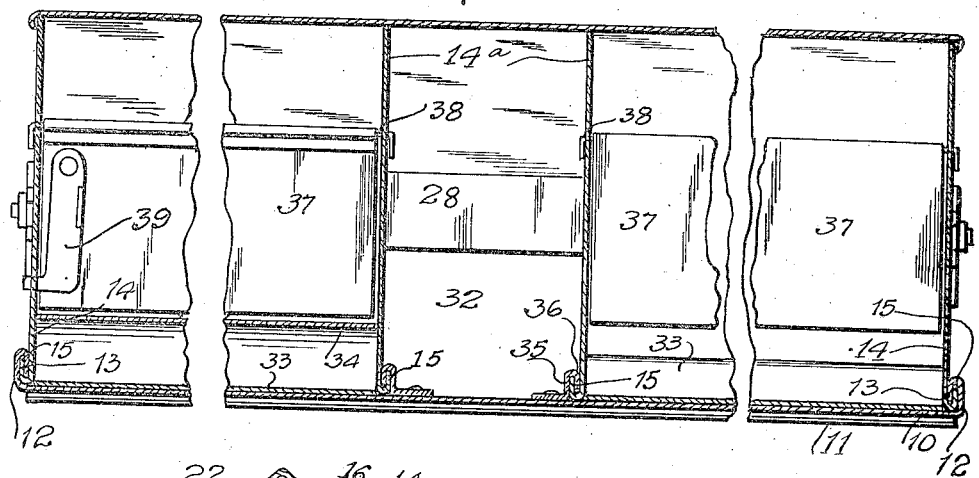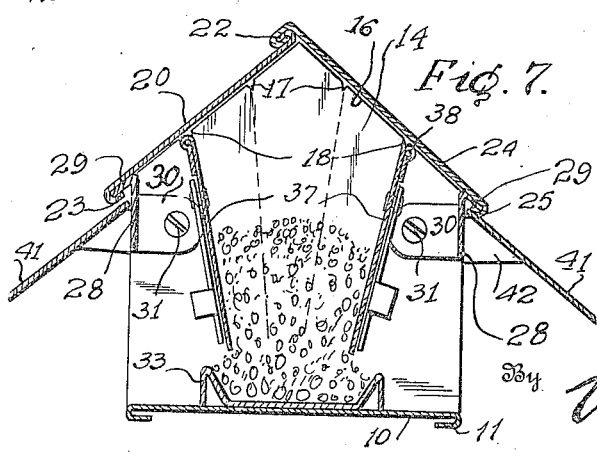

1,437,462

UNITED STATES PATENT OFFICE.

LEO D. BELVEL, OF LINEVILLE, IOWA.

POULTRY FEEDER.

Application filed April 15, 1922. Serial No. 553,200.

*To all whom it may concern:*

Be it known that I, LEO D. BELVEL, a citizen of the United States, residing at Lineville, in the county of Wayne and State of Iowa, have invented certain new and useful Improvements in Poultry Feeders, of which the following is a specification, reference being had to the accompanying drawings.

This invention relates to poultry feeders, and particularly to that class of poultry feeders embodying a house or casing, feeding troughs extending longitudinally of the house or casing, and a hopper discharging into the feeding troughs.

One of the objects of this invention is to provide a poultry feeder of this character which is composed of sections, which sections may be very readily disassembled for transportation or as readily assembled and set up.

A further object is to provide a construction of this character which, when set up, provides a thoroughly water-tight housing for the feed, thus preventing the feed from being rained on and becoming sour.

Still another object is to provide a feeder of this character having wings which are adjustable so as to prevent, if desired, large poultry from feeding, thereby permitting the small chickens to secure the feed which they need without any danger of being trampled on or being forced out of place by the larger fowl.

Another object is to provide a feeder of this character which is convertible for use either with mash or tankage, fancy feeds or common chops, from millet to shelled corn, and in ths connection to provide a feeder which may be adjusted to discharge two sizes of feed so that large chickens can feed at one portion of the feeder while small chickens can utilize the other.

A further object is to provide separate feed bins and an intermediate roofed space affording either a place for a water pan or pan containing tonic or other liquid, or a runway for the small chicks.

A still further object is to provide a device of this character having the adjustable wings heretofore referred to so as to accommodate either small chicks or larger fowl, which wings may be removed to permit any sized fowl to feed from the feeder, or which wings can be turned down so as to entirely close access to the feeder and prevent rats, mice and other vermin from eating the food, thereby preventing the feed from being wasted.

Other objects will appear in the course of the following description.

My invention is illustrated in the accompanying drawings, wherein:—

Figure 1 is a perspective view of a poultry feeder constructed in accordance with my invention, the roof being removed and one of the shields being broken away;

Figure 2 is a fragmentary perspective view of one end of the feeder shown in Figure 1, the roof section 20 being partly slipped off;

Figure 3 is a fragmentary perspective view of one end of the feeder, showing the roof section 24 being slid into place;

Figure 4 is an end elevation of the feeder;

Figure 5 is a section on the line 5—5 of Figure 1;

Figure 6 is a section on the line 6—6 of Figure 1;

Figure 7 is a section on the line 7—7 of Figure 1.

Referring to these drawings, 10 designates the bottom plate of my feeder, which is made of sheet metal of a suitable length and having its lateral margins turned over and inward, as at 11, these leaves, crimps or bends acting to strengthen the elongated metal plate and afford a firm foundation upon the ground. The extremities of this bottom plate 10 are upwardly flanged, as at 12, and then downwardly bent, as at 13. Coacting with the extremities of the plate 10 are the end plates 14 which have their lower edges upwardly and outwardly flanged, as at 15, these being adapted to slip into the beads 12 and interlock therewith. These end plates have upwardly converging edges adjacent their upper ends, as at 16, and are notched, as at 17 and 18. One of these edges 16 is provided with an outwardly extending flange 19 with which a roof section 20 is adapted to engage. This roof section 20 has a length equal to the length of the bottom and has its opposite extremities inwardly turned, as at 21, to engage over the flanges 19.

The upper edge of the roof section 20 is turned over to form a flange 22, while the lower margin of the roof section 20 is turned upward and inside of the roof section to form a flange 23. This roof section is slid into place by engaging the flanges 21 with the flanges 19 and sliding the roof section upward into place. The other roof section 24 is formed on one edge with the inwardly turned flange 25 and at its opposite margin this section is curved, as at 26, and then upwardly and inwardly flanged, as at 27. The flange 27 of this roof section 24 engages with the flange 22, while the flange 25 engages with a longitudinally extending strip 28 which extends longitudinally along the feeder at the junction of the inclined edges 16 with the vertical edges of the ends 14, this strip 28 having its upper edge reversely bent, as at 29, so as to form a flange with which the flange 25 will engage. There are two of these strips 28, one on each side, and the roof section 20 engages by its flange 23 with the flange 29 of the corresponding strip. Each of these strips 28 is supported by having its ends inwardly bent, as at 30, and perforated for the passage of a bolt 31 which extends through the corresponding end 14. It will be seen that the roof section 24 is slid into place longitudinally, engaging the flanges 22 and 29, while the roof section 20 is slid into place at right angles to the length of the feeder, the flanges 21 engaging the flanges 19. The roof section 20 is, of course, first put in place and then the roof section 24.

Intermediate the ends of the feeder there are provided partitions 14ª which are of the same character as the ends 14, except that they are not provided with flanges 19, these partitions 14ª being spaced from each other so as to provide a compartment 32 covered by the roof and within which water founts may be placed. These partitions 14ª are also provided with the notches 17 and 18.

Attached to the bottom 10 is a trough-shaped member 33 having upwardly and outwardly extending, marginal flanges, there being two of these trough-shaped members, one disposed between each partition 14ª and the adjacent end 14. Adapted to coact with each of these cross head members 33 is a strip of metal 34 which is V-shaped in cross section, forming a divider for a purpose which will be later stated. Each of these V-shaped strips is adapted to be removable from the trough 33. The partitions 14ª at their lower ends are upwardly flanged, as at 15, as previously described for the ends 14, and these upwardly extending flanges 15 are engaged with strips of metal 35 which are flanged and attached to the bottom 10, then extend vertically upward and then downward to form a flange 36 interlocking with the flange 15 on the corresponding partition 14ª. Thus these partitions are held firmly in place but may be readily removed.

Coacting with the trough 33 and the dividers 34 are swinging members 37. There are two of these swinging members 37 to each of the feed compartments, and each swinging member consists of a metallic plate, the upper end of which is formed to provide a bead enclosing a wire 38, this wire 38 being downwardly bent at its ends and being adapted to engage in the notches 17 or 18. Pivoted on each of these swinging members 37 is a latch 39 having a pointed extremity adapted to be forced through a perforation 40 in one of the end walls 14 or the corresponding partition 14ª. These swinging walls 37 may have their pintles 38 adjusted to engage in either the notches 17 or the notches 18. When they are engaged in the notches 18, the swinging walls 37 may be adjusted so as to be nearly vertical. This gives more pitch to these walls, which together constitute a feed hopper or container, thus preventing feed from clogging. When the pintles 38 of these walls 37 are disposed in the notches 17, the free edges of the walls may be adjusted into a relatively great angle to a vertical plane so as to fit the feed container for common chops or seed from either millet seed or shelled corn.

It will be understood that there are a plurality of the holes 40 with which the latches of the walls 37 engage so that these walls 37 may be adjusted to any desired pitch. Where chops or seed from millet seed to shelled corn are being fed, the V-shaped dividers 34 will be used and the free edges of the walls 37 will be adjusted nearer to or further from the apex of the divider so as to regulate the feed. Where, however, tankage or mash is being fed, the walls 37 will be given a relatively steep pitch, in other words will be very nearly parallel to a vertical plane and the divider will not be used but will be removed from the trough 33, as illustrated in Figure 7.

For the purpose of preventing large chickens from securing feed when small chickens are to be fed, I provide shields or wings 41 which extend along the opposite faces of the feeder in front of the strips 28, these wings being adjustable either into a vertical position, in which position they close the opposite sides of the feeder and prevent access of chickens to the food therein, or may be turned up nearly to a horizontal position, in which position they will permit almost complete access to be had by all chickens to the food. To this end, these wings 41 are formed at their ends with angularly bent extensions 42, these extensions being longitudinally slotted, and through these extensions pass the bolts 31. These bolts preferably have wing nuts on them so that the wings or shields may be clamped in adjusted position. These shields may be turned to many different positions, as indicated in dotted lines in Figure 5, and thus may be adjusted to the tiniest chicks or to full grown chickens. By adjusting the shields in a vertical position, the feeder may be closed up for the night, preventing access of rats, mice and other vermin to the feed. Under all circumstances these shields, unless they are entirely taken off, form continuations of the roof and provide water sheds which will prevent the feed beneath the shields from being wetted. Inasmuch as feed is discharged into the trough 33, it will be obvious that the feed cannot be scratched out by the chicks and will not, therefore, become wasted, but that the chicks have to enter the feeder in order to secure the feed and eat from the trough.

As before remarked, the space 32 between the two sections of the feeder may be either used for water troughs or bottles or have troughs or bottles containing tonic or other medicine for the chicks, or small chicks may use it simply as a runway, this runway being protected by the roof and by the wings or shields so that small chicks may very readily get in out of the rain or hot sun if desired without any danger of being crowded out of place by the larger chicks.

A feeder constructed in accordance with this invention promotes the growth of small chicks because they receive steady care so that they will develop for the early markets. The feeder saves the feed from rats, mice, sparrows and other pests and thus is economical. The feed is kept dry and wholesome and the feeder may be adjusted so as to furnish the proper feed at the proper time. The young chicks are prevented from being mashed or injured by older and larger chickens, and at the same time the device may be adapted for winter feeding of grown poultry.

It will be obvious that the shields may be adjusted for two sizes of chicks at the same time, that is small chicks can feed on one side and larger chickens on the other side. The feed container comes entirely to the roof so that if anything should turn the feeder upside down very little feed would be spilled. Mites and lice will not infest this feeder because they will have no place to stay, and the feeder can be easily scalded out with hot water. The feeder will not choke up in damp weather. The feeder can be readily taken apart for shipment or as readily set up. In actual practice the feeder will be some 30" long, 8" wide, and 8" high, but obviously these proportions may be varied.

While I have illustrated certain details of construction which I believe to be thoroughly effective, I do not wish to be limited thereto, as it is obvious that these might be varied in many ways without departing from the spirit of the invention as defined in the appended claims.

I claim:—

1. A poultry feeder including a bottom and end walls, a downwardly divergent roof detachably mounted on the end walls, and downwardly depending hopper walls having their upper ends adjustably mounted on the upper ends of the end walls for bodily movement toward or from each other.

2. A poultry feeder including a bottom, end walls, a downwardly diverging roof mounted on the end walls, hopper walls swingingly mounted at their upper ends upon the free edges of the end walls and adjustable at their upper ends toward or from each other on said end walls, and means for holding said hopper walls adjusted in different angular relations to a vertical plane.

3. A poultry feeder including a bottom, end walls, the upper edges of the end walls being upwardly and centrally inclined and said upper edges having a plurality of notches, depending hopper walls having pintles at their upper ends adapted to engage in said notches of the end walls to thereby swingingly support the hopper walls, and a latch carried upon each hopper wall and adapted to hold the hopper wall in an angularly adjusted position with relation to a vertical plane.

4. A poultry feeder including a bottom, end walls, a roof composed of downwardly divergent sections projecting beyond the edges of the end walls, shields extending downward from beneath the lower edge of the roof and forming extensions thereof, said shields being adjustably mounted upon the end walls for movement into or out of angular relation to a vertical plane.

5. A poultry feeder including a bottom, end walls, a roof composed of downwardly divergent sections, shields, each shield having an angularly bent terminal portion lying flat against the end wall and longitudinally slotted, and bolts passing through the end walls and through the slots of said terminal portions of the shield whereby the shields may be turned into or out of a vertical plane.

6. A poultry feeder including a bottom, end walls, a roof, downwardly extending hopper walls spaced at their lower edges from the bottom, a trough mounted upon and having a width less than the bottom and extending longitudinally thereof, into which said hopper formed by said walls discharges, and a V-shaped divider adapted to be removably disposed in the bottom of said trough and having a width equal to the distance between the lateral flanges of the trough to thereby engage said lateral flanges and be held from lateral movement within the trough.

7. A poultry feeder including a bottom, end walls detachably engaged with the bottom, the upper ends of the end walls being upwardly and convergently inclined, the margin of one of said inclined edges of each end wall being outwardly turned to form a flange, a roof section having inwardly turned flanges at its extremity adapted to slidingly engage said last named outwardly turned flanges, said roof section at its upper edge having a rearwardly turned flange, a member disposed between the end walls on the side opposite said roof section and having a downwardly turned flange at its upper edge, and a second roof section having inwardly turned flanges at its longitudinal margins to engage with the last named flange of the first named roof section and with the flange on said member.

8. A poultry feeder including a bottom and end walls, the upper ends of the end walls being convergently and upwardly inclined, and a roof composed of two sections, one of said sections having longitudinal sliding engagement with the feeder and the other section having transverse sliding engagement therewith, both of said roof sections at their adjacent edges having interlocking flanges.

9. A poultry feeder having a bottom, end walls, a pair of walls intermediate the end walls and spaced from each other, hopper walls disposed between each end wall and the adjacent intermediate wall, a roof resting upon said walls, and shield members mounted upon the end walls for movement into or out of a vertical position, the space between the intermediate walls being adapted to constitute a runway.

10. In a feeder, a feed trough, end walls, a hopper discharging into the feed trough, a roof mounted upon said end walls, detachable shields having their upper edges disposed just below the roof, each shield having a pair of inwardly extending slotted arms fitting against the outside faces of the end walls, and clamping means passing through the slots of said arms and holding the shields in adjusted position.

In testimony whereof I hereunto affix my signature.

LEO D. BELVEL.